(12) United States Patent  
Webb et al.

(10) Patent No.: US 6,742,328 B2
(45) Date of Patent: Jun. 1, 2004

(54) SYSTEMS AND METHODS FOR CONTROLLING DIESEL ENGINE EMISSIONS

(75) Inventors: Cynthia Chaffin Webb, San Antonio, TX (US); Phillip Anthony Weber, San Antonio, TX (US); Magdi K. Khair, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/268,896

(22) Filed: Oct. 11, 2002

(65) Prior Publication Data

US 2003/0074893 A1 Apr. 24, 2003

Related U.S. Application Data

(60) Provisional application No. 60/328,063, filed on Oct. 11, 2001.

(51) Int. Cl.[7] .................................................. F01N 3/00
(52) U.S. Cl. ........................... 60/285; 60/274; 60/288; 60/295; 60/297; 60/300
(58) Field of Search .......................... 60/274, 276, 285, 60/286, 287, 288, 295, 297, 311; 300/303; 422/169, 170, 171, 172

(56) References Cited

U.S. PATENT DOCUMENTS

| | | | | |
|---|---|---|---|---|
| 5,406,790 A | * | 4/1995 | Hirota et al. | 60/276 |
| 5,746,989 A | * | 5/1998 | Murachi et al. | 60/274 |
| 5,974,791 A | * | 11/1999 | Hirota et al. | 60/286 |
| 6,082,100 A | * | 7/2000 | Boegner et al. | 60/295 |
| 6,090,187 A | * | 7/2000 | Kumagai | 60/303 |
| 6,105,365 A | * | 8/2000 | Deeba et al. | 60/274 |
| 6,134,883 A | * | 10/2000 | Kato et al. | 60/276 |
| 6,145,303 A | | 11/2000 | Strehlau et al. | |
| 6,170,259 B1 | * | 1/2001 | Boegner et al. | 60/286 |
| 6,212,885 B1 | | 4/2001 | Hirota et al. | |
| 6,233,927 B1 | * | 5/2001 | Hirota et al. | 60/288 |

FOREIGN PATENT DOCUMENTS

| | | |
|---|---|---|
| DE | 0 758 713 A1 | 6/1997 |
| DE | 1 101 908 A2 | 5/2001 |
| GB | 0 778 072 A2 | 6/1997 |
| WO | WO 01/56686 A1 | 8/2001 |

* cited by examiner

Primary Examiner—Thomas Denion
Assistant Examiner—Tu M. Nguyen
(74) Attorney, Agent, or Firm—Oliff & Berridge, PLC

(57) ABSTRACT

Systems and methods for controlling diesel engine emissions, including, for example, oxides of nitrogen emissions, particulate matter emissions, and the like. The emission control system according to this invention is provided in the exhaust passageway of a diesel engine and includes a catalyst-based particulate filter; and first and second lean $NO_x$ trap systems coupled to the catalyst-based particulate filter. The first and second lean $NO_x$ trap systems are arranged in a parallel flow configuration with each other. Each of the first and second lean $NO_x$ trap systems include a carbon monoxide generating catalyst device, a sulfur trap device, a lean $NO_x$ device, a supplemental fuel injector device, and a plurality of flow diverter devices.

27 Claims, 4 Drawing Sheets

SYSTEMS AND METHODS FOR CONTROLLING DIESEL ENGINE EMISSIONS

The U.S. Government has a paid-up license in this invention and the right in limited circumstances to require the patent owner to license others on reasonable terms as provided by the terms of U.S. Government Contract No. NCI-1-31024-02 awarded by the National Renewable Energy Laboratory.

BACKGROUND OF THE INVENTION

1. Field of the Invention

This invention relates to systems and methods for controlling diesel engine emissions, including, for example, oxides of nitrogen emissions, particulate matter emissions, and the like.

2. Description of Related Art

New emission limits call for major reductions in oxides of nitrogen ($NO_x$) and particulate matter (PM) emissions from diesel engines. To achieve low $NO_x$/PM emission levels, engine manufacturers have developed systems for exhaust gas recirculation (EGR), while exhaust after-treatment suppliers have developed catalyst-based diesel particulate filters (CB-DPFs).

Using catalyst-based diesel particulate filters has been found to reduce PM emissions below the stringent requirements of the new heavy-duty emissions standards proposed for the 2005 through 2010 time frame. However, engine-out $NO_x$ emissions are still six to eight times higher than the heavy-duty emission standards for model year 2007 and three to one-hundred times greater than the 2009 light-duty emission standards.

To achieve the targeted $NO_x$ emission levels, research is being conducted with various post-combustion devices and/or systems. One such device/system is a selective catalytic reduction (SCR) device/system, which uses urea or ammonia as reductant. While selective catalytic reduction systems have been used in stationary applications for several years, their use and experience record with the mobile fleet is limited.

Another post-combustion $NO_x$ emissions control device/system is the $NO_x$ adsorber system, also known as lean $NO_x$ trap (LNT) or $NO_x$ adsorber catalyst (NAC), which requires a reductant for regeneration. The $NO_x$ adsorber system generally performs three distinct functions. The first function is to convert nitric oxide (NO) to nitrogen dioxide ($NO_2$), typically done using a precious metal oxidation catalyst. As part of the second function, the nitrogen dioxide may then be trapped in the second stage of the lean $NO_x$ trap. The third function is to reduce $NO_2$ to diatomic nitrogen.

The $NO_x$ adsorber system is a base metal oxide $NO_2$ trap that requires periodic regeneration by enriching the exhaust via supplemental hydrocarbon. However, because of the chemical similarity of sulfur dioxide ($SO_2$) and $NO_2$, the lean $NO_x$ trap also has a great affinity for trapping $SO_2$. Sulfur dioxide is more stable on the trap, making it harder to release. The $SO_2$ release (desulfurization) also requires higher temperatures, which are potentially harmful to the efficiency and durability of the lean $NO_x$ trap. These factors make the physical time required for desulfurization much greater, for example, 10 times or more, than the time required for $NO_x$ regeneration (which is also known as $NO_x$ removal from trap). For these reasons the lean $NO_x$ trap system requires extremely low sulfur fuel and delicate strategy work to remove any sulfur that has deposited on the trap without damaging the trap. One of the requirements for desulfurization of a lean $NO_x$ trap is to conduct the desulfurization at as low a temperature as possible. However, because the rate of desulfurization is directly related to temperature, as well as the reductant mass, the lower the temperature, the longer the desulfurization event.

The implications of a long desulfurization event are very significant to the overall efficiency and/or complexity of the system. FIG. 1 shows a related research-developed engine emission control system 100 for a diesel engine 150. As shown in FIG. 1, the diesel engine emission control system 100 includes a diesel particulate filter (DPF) 102 and a lean $NO_x$ trap (LNT) 104, one of each DPF/LNT system, arranged in a in-series configuration. The engine emission control system 100 also includes an oxidation catalyst 106.

The system 100 illustrated in FIG. 1 generally offers low cost and complexity. However, the engine emission control system of FIG. 1 has efficiency drawbacks in that $NO_x$ emissions cannot be trapped while the system is undergoing $NO_x$ regeneration or desulfurization. Studies have shown that the $NO_x$ regeneration event can consume up to 6% of total operation time of the diesel engine and that desulfurization can take several minutes, with the frequency of the event being directly related to fuel sulfur level. This reduces the potential overall efficiency of the system. Furthermore, because the related DPF/LNT configuration shown in FIG. 1 requires full flow regeneration, there is a large fuel consumption penalty associated with bringing the full flow to overall reducing conditions.

FIG. 2 schematically illustrates another related research-developed configuration of a LNT-DPF emission control system 200 for a diesel engine 250. As shown in FIG. 2, the diesel engine emission control system 200 has dual, full-size parallel DPF/LNT systems 210, 220. Each of the parallel DPF/LNT systems 210, 220 includes a diesel particulate filter (DPF) 212, 222 and a lean $NO_x$ trap (LNT) 214, 224, one of each DPF/LNT system, arranged in an in-series configuration. The engine emission control system 200 also includes an oxidation catalyst 206.

Using the diesel engine emission control system 200 with parallel DPF/LNT system configuration, one bank of the system can be regenerated or desulfurized while the other bank performs the trapping function. In addition, the emissions flow can be diverted using valves 216, 226 to create low flow conditions on the regenerating bank. This arrangement reduces the required supplemental fuel needed to create a reducing environment, which also reduces the incurred fuel economy penalty associated with regeneration or desulfurization.

One drawback with the diesel engine emission control system 200 is that it is physically very large. In addition, because the system requires two full size CB-DPF catalysts, the system can be very expensive. Further, the frequency between $NO_x$ regeneration is usually on the order of one minute. If a desulfurization event is being conducted and takes several minutes to complete, the trapping LNT will become saturated and need to be regenerated. This would cause $NO_x$ to begin to break through, requiring regeneration to be performed in the full flow bank/leg.

For the system 200 to maintain efficiency while desulfurizing, a third leg would be needed to allow desulfurization and regeneration to be conducted on the first and second banks while the third is trapping. This configuration is not very practical for production purposes as the system would be extremely large, require complex controls, and would be prohibitively expensive.

SUMMARY OF THE INVENTION

This invention provides systems and methods for diesel engine emission control utilizing sulfur protection for lean $NO_x$ traps.

In an aspect of the invention, the system relies on post-combustion injection (in-cylinder or in-exhaust) to provide reductant to the CB-DPF to generate exotherms high enough to regenerate a CB-DPF when necessary.

In another aspect of the invention, the system relies on supplemental fuel injection (in-exhaust) across a carbon monoxide generating (COG) catalyst to provide exotherms high enough to desulfurize a Sulfur-trap (S-trap).

In a further aspect of the invention, the COG catalyst is used to partially oxidize the fuel provided for regeneration from the supplemental fuel injector (SFI) to create carbon monoxide (CO) and smaller hydrocarbons, while simultaneously removing oxygen from the exhaust emitted by the diesel engine.

In a further aspect of the invention, the system diverts a portion of the total exhaust to reduce the supplemental reductant required to achieve a stoichiometric or rich air-fuel ratio (AFR) condition at the inlet of an LNT or S-trap to facilitate its regeneration.

In an aspect of the invention, the system uses a sulfur trap to prevent sulfur poisoning of the LNT, resulting in reduced LNT regeneration frequency requirements, thus reducing the incurred fuel economy penalty.

In further embodiments, the system makes use of certain driving conditions to perform partial regenerations to minimize fuel economy impact and to maintain high efficiency levels (specifically deceleration regenerations take advantage of low-flow exhaust conditions).

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail below, with reference to the following figures, in which.

DETAILED DESCRIPTION OF PREFERRED EMBODIMENTS

The systems and methods according to this invention provide for the integration of an emission control system consisting of a diesel engine capable of post-injection with post-combustion exhaust emission control devices. The systems and methods of this invention present another option for maintaining high $NO_x$ efficiency, reasonable volume, and minimal fuel economy penalty.

Figure 1:
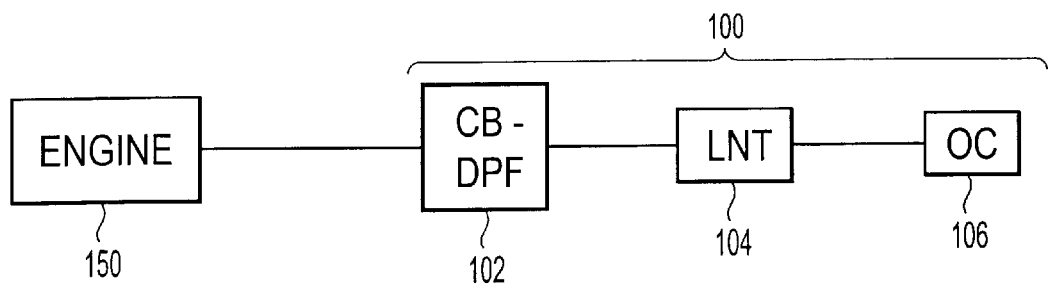
FIG. 1 is a block diagram showing a related, research-developed, diesel engine emission control system with an in-line, in series LNT system configuration.
Figure 2:
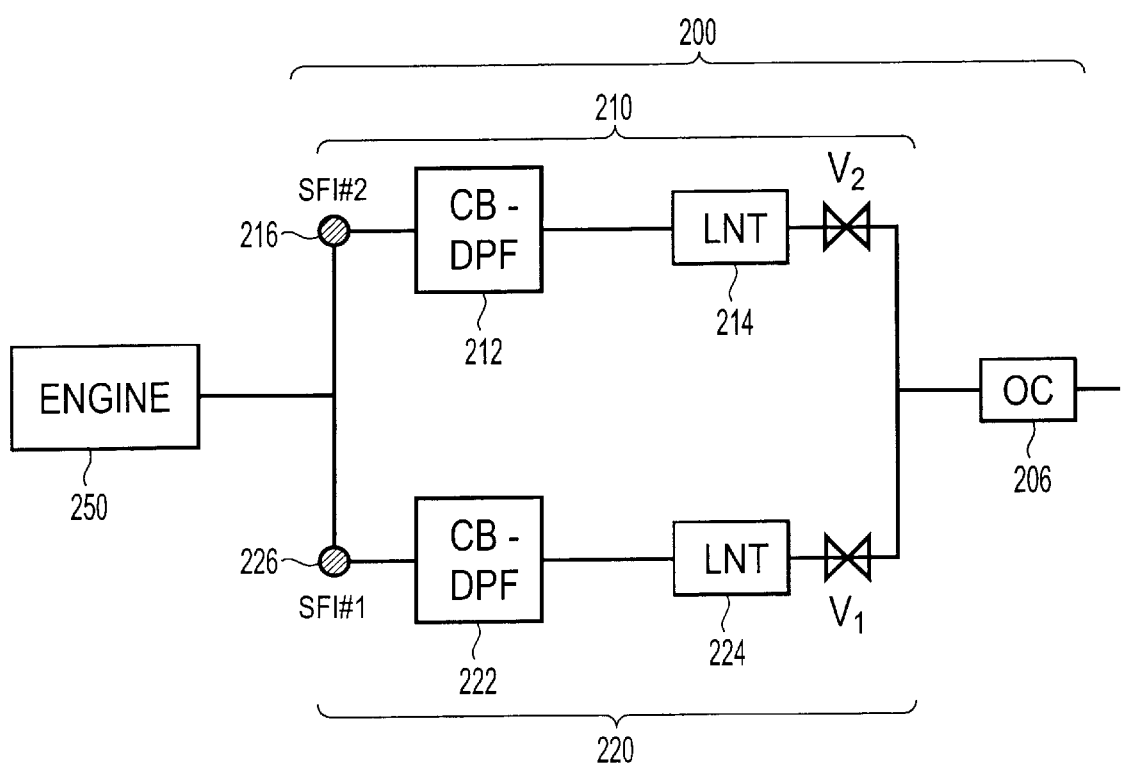
FIG. 2 is a block diagram showing another related, research-developed, diesel engine emission control system having a dual, parallel LNT system configuration.
Figure 3:
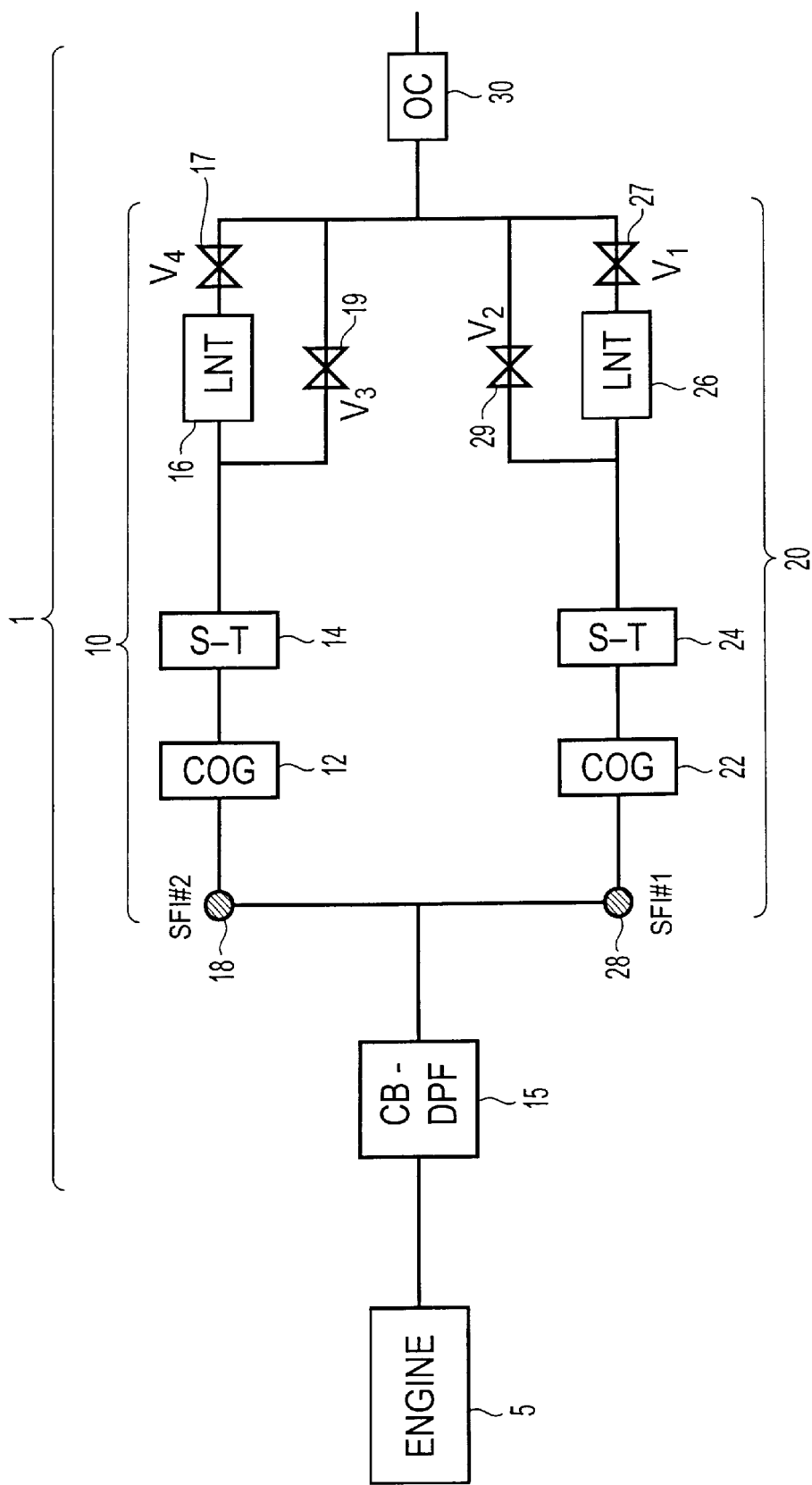
FIG. 3 is a block diagram showing one exemplary embodiment of a diesel engine emission control system having an in-line CB-DPF device and dual full-sized LNT systems with COG catalysts and sulfur traps according to this invention.

FIG. 3 schematically illustrates a block diagram of an emission control system 1 for a diesel engine 5 according to an embodiment of this invention. The emission control system 1 includes a catalyst based diesel particulate filter (CB-DPF) 15 coupled to a first and second full sized LNT systems 10, 20, which are arranged in a parallel configuration with each other. Each of the first and second full sized LNT systems 10, 20 includes a first oxidation catalyst device 12, 22, such as a CO generating catalyst (COG) 12, 22; a sulfur trap (S-T) 14, 24; a lean $NO_x$ Trap (LNT) device 16, 26; a supplemental fuel injector (SFI) device 18, 28; and diverter valves 17, 19, 27, 29. The emission control system 1 may optionally include a second oxidation catalyst (OC) device 30.

A significant benefit of this system is that it utilizes a single CB-DPF, which lowers the cost compared to two CB-DPFs and requires less physical space under the vehicle.

It will be appreciated by those skilled in the art that the CB-DPF 15 can be placed upstream of the LNT system 10, 20, or alternatively, downstream of the the LNT system 10, 20 in-place of the second oxidation catalyst (OC) 30. In the emission control system 1 according to this invention, the regeneration or desulfurization event would also be conducted under low flow conditions through the management of exhaust gas diverter valves.

The CO necessary for regeneration would be created by a COG catalyst, which could be an inefficient oxidation catalyst. Its function is to partially oxidize the supplemental fuel for LNT regeneration into a more readily usable form, while simultaneously consuming the excess $O_2$ from the engine exhaust. Because it is an inefficient catalyst, the catalyst would be low in volume, precious metal loading and cost, such that two COG catalysts take up less space, cost less and would be more efficient at CO generation than a second CB-DPF.

Another feature of this system 1 is the sulfur trap 14, 24. The function of the sulfur trap 14, 24 is to prevent sulfur poisoning on the LNT 16, 26 which also extends the time between LNT regenerations. A sulfur trap is more thermally stable than an LNT and can be desulfurized at a higher temperature. The implication of this is that the desulfurization event could be conducted much more quickly, thereby allowing desulfurization to be completed before the trapping leg requires $NO_x$ regeneration. Also, the LNT device 16, 26 would not be exposed to the high temperatures necessary for desulfurization, and may experience greater durability.

A shown in FIG. 3, the system is configured to have a bypass leg to redirect the desorbed sulfur during desulfurization. However, sulfur can be removed from the trap under reducing conditions, and could be released as $H_2S$. Since the LNT's affinity is for oxides ($SO_2$), $H_2S$ should pass through the LNT. Therefore, if the Sulfur trap (S-trap) is efficient at releasing the sulfur as $H_2S$, then the bypass leg would not be necessary, and the desulfurization would not poison the LNT. In addition, the environment would be reducing during desulfurization, and a thorough $NO_x$ regeneration could also be accomplished.

Figure 4:
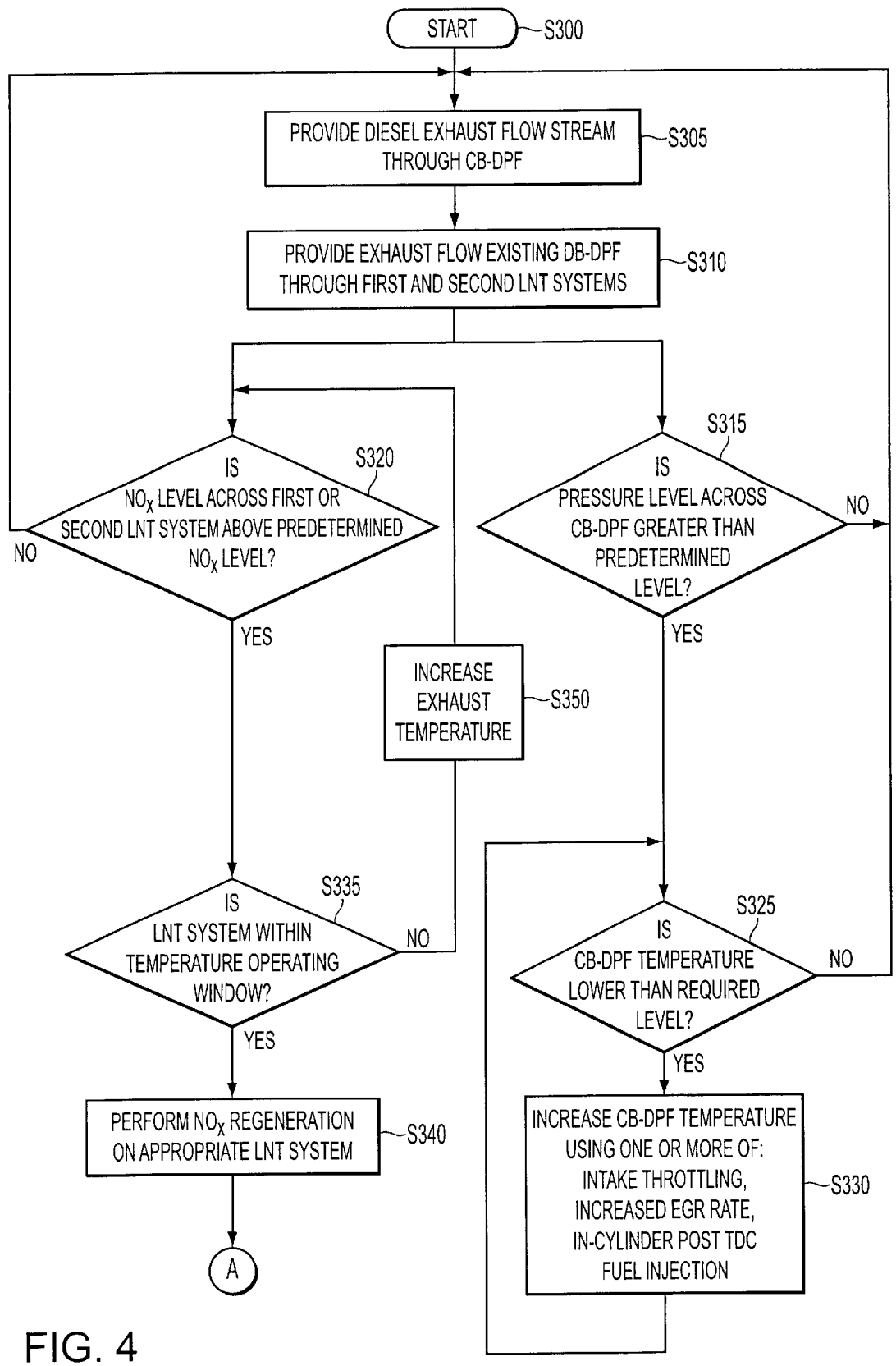
FIG. 4 is a flowchart outlining one exemplary embodiment of a method for controlling diesel engine emissions according to this invention.
Figure 4A:
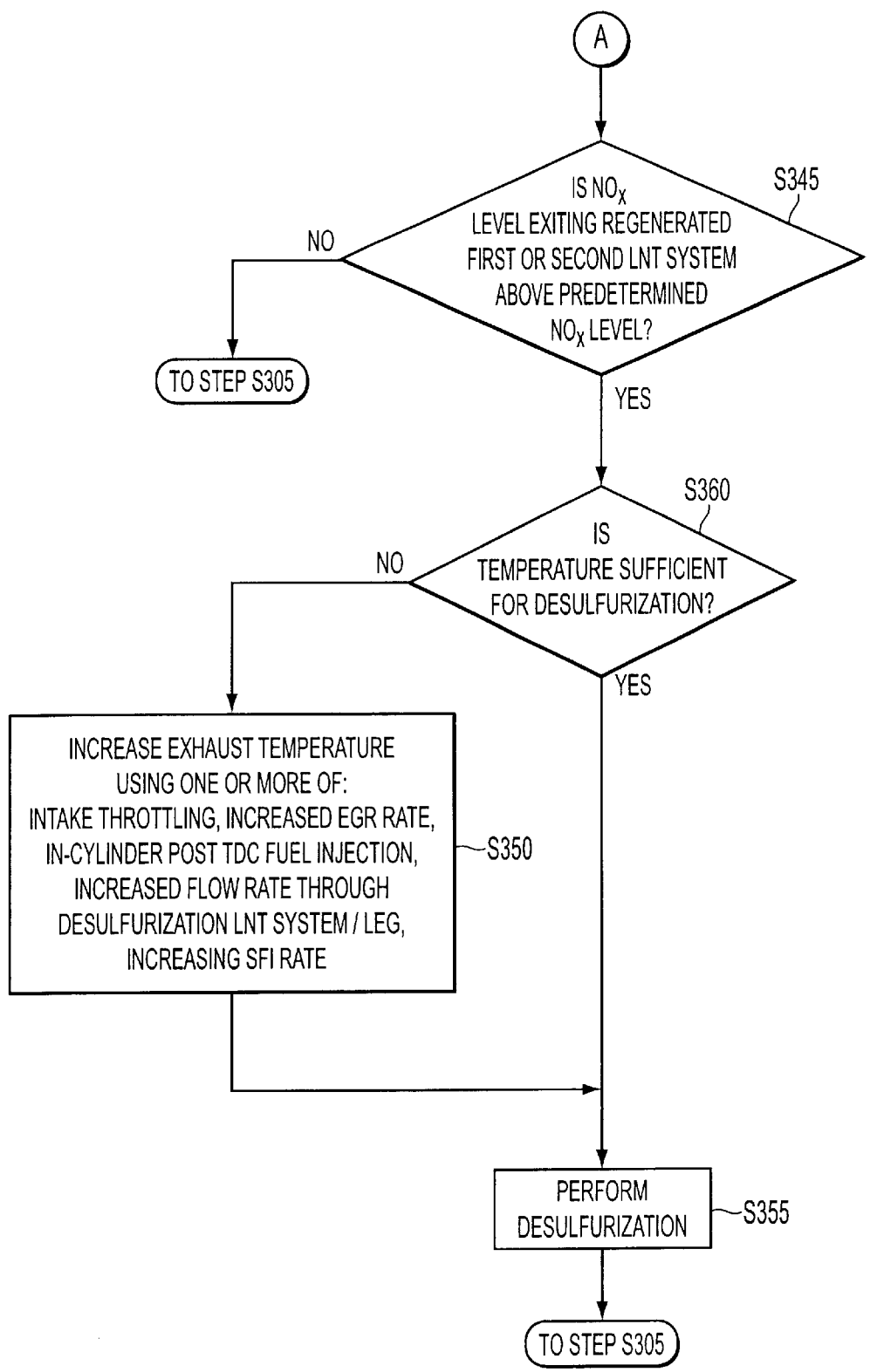

FIG. 4 is a flowchart outlining one exemplary embodiment of a method for controlling diesel engine emissions, including, for example, oxides of nitrogen emissions, particulate matter emissions, and the like, according to this invention. As shown in FIG. 4, the method begins in step S300, and continues to step S305, where the diesel exhaust flow stream is provided through the catalyst-based diesel particulate filter (CB-DPF). Under normal operation, all of the engine exhaust passes first through the CB-DPF and then through the LNT systems. The function of the CB-DPF is to trap all particulates when cold, oxidize soluble particulates at warm temperatures, and oxidize insolubles at elevated temperature. In addition, if the temperature is high enough, some of the $NO_2$ generated by the CB-DPF will chemically remove carbon particles already trapped. Operation then continues to step S310.

In step S310, the exhaust flow is provided into the first and second LNT systems where any remaining NO is oxidized to $NO_2$, and the $NO_2$ then adsorbs on the surface of the LNT. To ensure that the particulate trap device remains efficient and does not fill up with soot, it is necessary to also monitor the differential pressure across the system and to force a regeneration event when and if necessary. Thus, in step S315, a determination is made whether the pressure level across CB-DPF is greater than a predetermined pressure level. If the differential pressure across CB-DPF indicates a higher pressure level than the predetermined level, CB-DPF regeneration may be needed, operation continues to step S315 and S320. Otherwise, operation returns to step S305.

In step S325, if the temperature of the CB-DPF is at the required level, the CB-DPF will self regenerate. However, if a determination is made that the CB-DPF temperature is lower than a predetermined or required level, then the CB-DPF temperature needs to be increased to initiate a regeneration event. Thus, operation continues to step S330.

In step S330, in various exemplary embodiments according to this invention, increasing the CB-DPF temperature may be done using one or more of: intake throttling, increased exhaust gas recirculation (EGR) rate, or in-cylinder post-TDC (top dead center on power stroke) fuel injection while the exhaust valves are open (referred to as post-injection).

Intake throttling and increased EGR would increase the exhaust gas temperature from the engine. Post-injection would increase the CB-DPF temperature by using the exothermic heat generated by the oxidation of the post-injected fuel. In various exemplary embodiments, the methods according to this invention could be used separately or in combination. Further, the methods would be optimized to produce the highest exhaust temperature for the smallest fuel penalty.

Operation then simultaneously continues to step S320, where a determination is made whether the $NO_x$ level across first and/or second LNT systems is greater than a predetermined level. When $NO_x$ monitors at the inlet and outlet of the LNT indicate that $NO_x$ reduction across the LNT has fallen below acceptable levels, regeneration and/or desulfurization will be needed. Thus, operation returns to step S335 where it is determined if the LNT system is at the operating temperature. LNT $NO_x$ regeneration, performed at step S340, typically requires temperatures above 250° C. and a stoichiometric or slightly rich exhaust gas air fuel ratio (AFR).

To generate the rich exhaust gas AFR, a variety of methods known in the art may be used. In a preferred embodiment, using supplemental fuel injection (SFI) may provide better efficiencies, since this approach would confine the excess reductant to the regenerating leg only.

If the temperature is not sufficient for regeneration, the temperature may be increased (step S350) using any or all of the methods described above for increasing the CB-DPF temperature. These methods include using one or more of: intake throttling, increased EGR rate, or in-cylinder post-TDC fuel injection.

In addition, temperature may also be controlled on the regenerating side by controlling exhaust flow and increasing or decreasing the amount of supplemental fuel. Because the COG may be an oxidation catalyst, an exothermic reaction will occur as the fuel is reacted, which will increase the exhaust temperature into the LNT.

If in step S345, after a period of regeneration, the $NO_x$ sensors indicate that $NO_x$ reduction across the LNT has still not returned to acceptable levels, then the need for desulfurization is indicated. Operation continues to Step S360.

Desulfurization, step S355, typically requires temperatures of at least 400° C., with higher temperatures requiring a shorter period of time to complete desulfurization. Therefore, in step S360, a determination is made whether the temperature is lower than a predetermined temperature level for desulfurization. If the temperature is higher than the predetermined or required level, operation continues to step S355 where desulfurization is performed.

If, however, a determination is made that higher exhaust stream flow temperatures are needed, operation continues to step S350, where exhaust stream temperatures are increased. The higher temperatures and reducing environment would be generated in the same manner as used for $NO_x$ regeneration, however, the exhaust gas temperature could be elevated by increasing flow through the desulfurizing leg, increasing the supplemental fuel injection rate, and/or increasing EGR during the event. This strategy would be optimized to achieve the fastest and most complete desulfurization with the smallest fuel economy penalty and performance penalty.

When the temperature is increased to a level higher than the predetermined or required level, operation continues to step S355 where desulfurization is performed. Operation of the method continues back to step S305 in a continuous fashion to control diesel engine emissions, including, for example, oxides of nitrogen emissions, particulate matter emissions, and the like.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An emission control system provided in the exhaust outlet or pathway of a diesel engine, the emission control system comprising:

a catalyst-based particulate filter; and first and second lean $NO_x$ trap systems coupled to the catalyst-based particulate filter, the first and second lean $NO_x$ trap systems arranged in a parallel flow configuration with each other;

wherein each of the first and second lean $NO_x$ trap systems comprises a first oxidation catalyst device, a sulfur trap device, a lean $NO_x$ device, a supplemental fuel injector device, and a plurality of flow diverter devices.

2. The emission control system of claim 1, further comprising a second oxidation catalyst device coupled to the first and second lean $NO_x$ trap systems on the downstream side.

3. The emission control system of claim 1, wherein the catalyst-based particulate filter is coupled upstream or downstream of the first and second lean $NO_x$ trap systems on the exhaust passageway of the diesel engine.

4. The emission control system of claim 1, wherein each of the first and second lean $NO_x$ trap systems are used alternatively to perform a regeneration or a desulfurization action of the lean $NO_x$ trap device.

5. The emission control system of claim 1, wherein the system uses post-combustion injection to provide reductant to the catalyst-based particulate filter to generate exotherms high enough to regenerate the catalyst-based particulate filter when necessary.

6. The emission control system of claim 1, wherein the post-combustion injection is performed using an in-cylinder or in-exhaust configuration.

7. The emission control system of claim 1, wherein the first oxidation catalyst device is a carbon monoxide generating catalyst device.

8. The emission control system of claim 1, wherein the system uses in-exhaust supplemental fuel injection across the first oxidation catalyst device to provide exotherms high enough to desulfurize the sulfur trap device.

9. The emission control system of claim 1, wherein a catalyst in the first oxidation catalyst device is used to partially oxidize the fuel provided for regeneration from the supplemental fuel injector to create carbon monoxide and smaller hydrocarbons, while simultaneously removing oxygen from the exhaust emitted by the diesel engine.

10. The emission control system of claim 1, wherein the system diverts a portion of the total exhaust to reduce the supplemental reductant required to achieve a stoichiometric or rich AFR condition at the inlet of the lean $NO_x$ trap device or the sulfur trap device to facilitate its regeneration.

11. The emission control system of claim 1, wherein the sulfur trap prevents sulfur poisoning of the lean $NO_x$ trap device, resulting in reduced lean $NO_x$ trap device regeneration frequency requirements.

12. A method of controlling exhaust emissions emitted by a diesel engine, the method comprising:
providing exhaust flow stream exiting the diesel engine through a catalyst-based particulate filter;
providing the exhaust flow exiting the catalyst-based particulate filter through first or second lean $NO_x$ trap systems coupled to the catalyst-based particulate filter, the first and second lean $NO_x$ trap systems being arranged in a parallel flow configuration with each other, the catalyst-based particulate filter being arranged in a in-series flow configuration with the parallel flow configuration of the first and second lean $NO_x$ trap systems;
performing a regeneration action upon a detection of a pressure level greater than a predetermined level across the catalyst-based particulate filter; and
performing a desulfurization action upon detection of $NO_x$ levels across the first or second lean $NO_x$ trap systems above than a predetermined $NO_x$ level.

13. The method of claim 12, wherein each of the first and second lean $NO_x$ trap systems are regenerated or desulfurized alternatively.

14. The method of claim 12, further comprising partially oxidizing a reductant provided for the regeneration action to create carbon monoxide and smaller hydrocarbons while simultaneously removing excess oxygen from the exhaust.

15. The method of claim 12, further comprising increasing the exhaust temperature to initiate a regeneration action.

16. The method of claim 15, wherein increasing the exhaust temperature to initiate a regeneration action comprises one or more of: intake throttling method, increasing the exhaust gas recirculation rate method, and in-cylinder post top dead center on power stroke fuel injection method.

17. The method of claim 12, wherein the desulfurization action comprises increasing the exhaust temperature using one or more of: intake throttling method, increasing the exhaust gas recirculation rate method, in-cylinder post top dead center on power stroke fuel injection method, increasing the flow through a desulfurization leg in each of the first and second lean $NO_x$ trap systems.

18. The method of claim 12, further comprising performing post-combustion injection to provide reductant to the catalyst-based particulate filter to generate exotherms high enough to regenerate the catalyst-based particulate filter when necessary.

19. The method of claim 18, wherein in-exhaust supplemental fuel injection provides exotherms high enough to perform the desulfurization action.

20. A method of controlling exhaust emissions emitted by a diesel engine, the method comprising:
providing exhaust flow stream exiting the diesel engine through a catalyst-based particulate filter;
providing the exhaust flow exiting the catalyst-based particulate filter through first or second lean $NO_x$ trap systems coupled to the catalyst-based particulate filter, the first and second lean $NO_x$ trap systems being arranged in a parallel flow configuration with each other;
performing a regeneration action upon a detection of a pressure level greater than a predetermined level across the catalyst-based particulate filter; and
performing a desulfurization action upon detection of $NO_x$ levels across the first or second lean $NO_x$ trap systems above than a predetermined $NO_x$ level,
wherein each of the first and second lean $NO_x$ trap systems comprises a first oxidation catalyst device, a sulfur trap device, a lean $NO_x$ device, a supplemental fuel injector device, and a plurality of flow diverter devices.

21. The method of claim 20, wherein each of the first and second lean $NO_x$ trap systems are regenerated or desulfurized alternatively.

22. The method of claim 20, further comprising partially oxidizing a reductant provided for the regeneration action to create carbon monoxide and smaller hydrocarbons while simultaneously removing excess oxygen from the exhaust.

23. The method of claim 20, wherein the desulfurization action comprises increasing the exhaust temperature using one or more of: intake throttling method, increasing the exhaust gas recirculation rate method, in-cylinder post top dead center on power stroke fuel injection method, increasing the flow through a desulfurization leg in each of the first and second lean $NO_x$ trap systems.

24. The method of claim 20, further comprising performing post-combustion injection to provide reductant to the catalyst-based particulate filter to generate exotherms high enough to regenerate the catalyst-based particulate filter when necessary.

25. The method of claim 24, wherein in-exhaust supplemental fuel injection provides exotherms high enough to perform the desulfurization action.

26. The method of claim 20, further comprising increasing the exhaust temperature to initiate a regeneration action.

27. The method of claim 26, wherein increasing the exhaust temperature to initiate a regeneration action comprises one or more of: intake throttling method, increasing the exhaust gas recirculation rate method, and in-cylinder post top dead center on power stroke fuel injection method.

* * * * *